United States Patent [19]

Veraart

[11] Patent Number: 5,127,599
[45] Date of Patent: Jul. 7, 1992

[54] DECELERATION ZONE IN A LINEAR MOTOR IN-TRACK TRANSIT SYSTEM

[75] Inventor: Pierre Veraart, Kingston, Canada

[73] Assignee: UTDC, Inc., Kingston, Canada

[21] Appl. No.: 548,263

[22] Filed: Jul. 5, 1990

[51] Int. Cl.⁵ ............................................. B61L 3/06
[52] U.S. Cl. ........................... 246/182 R; 246/187 B; 104/292; 188/164
[58] Field of Search ............... 188/155, 158, 159, 164, 188/165; 246/182 R, 182 A, 182 B, 182 C, 187 B; 104/292

[56] References Cited

U.S. PATENT DOCUMENTS

| | | | |
|---|---|---|---|
| 3,506,862 | 4/1970 | Nomura et al. | 310/93 |
| 3,540,541 | 11/1970 | Hayes | 246/29 R X |
| 3,691,368 | 9/1972 | Hoyler | 246/63 A X |
| 3,736,880 | 6/1973 | Ross | 104/148 MS |
| 3,768,417 | 10/1973 | Thornton et al. | 104/298 X |
| 3,774,025 | 11/1973 | Auer, Jr. et al. | 246/63 A |
| 3,803,466 | 4/1974 | Starkey | 318/135 |
| 3,827,371 | 8/1974 | Onoda | 104/148 LM |
| 3,828,236 | 8/1974 | Close | 246/187 B X |
| 3,847,089 | 11/1974 | Nelson | 104/292 X |
| 3,848,836 | 11/1974 | Wallgard | 246/63 R |
| 3,874,301 | 4/1975 | Alimanestianu | 104/29 B |
| 3,880,088 | 4/1975 | Grant | 104/168 |
| 3,904,942 | 9/1975 | Holtz | 318/135 |
| 3,934,183 | 1/1976 | Saufferer | 104/294 X |
| 3,937,431 | 1/1976 | Gunter | 246/182 B |
| 3,967,801 | 7/1976 | Baughman | 246/34 R |
| 3,974,778 | 8/1976 | Black et al. | 104/148 LM |
| 3,979,092 | 9/1976 | Perry et al. | 246/187 B X |
| 4,014,503 | 3/1977 | Raimer | 246/63 C X |
| 4,061,089 | 12/1977 | Sawyer | 104/23 FS |
| 4,068,152 | 1/1978 | Nakamura et al. | 104/298 X |
| 4,142,700 | 3/1979 | Ubel | 246/182 C X |
| 4,166,599 | 9/1979 | Auer, Jr. et al. | 246/63 A |
| 4,305,485 | 12/1981 | Dubreucq | 188/164 |
| 4,348,618 | 9/1982 | Nakamura et al. | 318/38 |
| 4,381,478 | 4/1983 | Saijo et al. | 246/182 C X |
| 4,471,356 | 9/1984 | Gidl | 246/63 R X |
| 4,651,071 | 3/1987 | Imanaka | 318/371 |
| 4,652,800 | 3/1987 | Fukuwatari | 318/135 |

(List continued on next page.)

FOREIGN PATENT DOCUMENTS

| | | |
|---|---|---|
| 0158114 | 11/1985 | European Pat. Off. |
| 0160523 | 11/1985 | European Pat. Off. |
| 278532 | 8/1988 | European Pat. Off. |
| 2257773 | 5/1924 | Fed. Rep. of Germany ...... 104/282 |
| 0012804 | 1/1989 | Japan ................................... 104/281 |

OTHER PUBLICATIONS

Patent Abstracts of Japan, vol. 5, No. 163 (E-78) (835), Oct. 20, 1981.
Patent Abstracts of Japan, vol. 10, No. 105 (M-471) (2162), Apr. 19, 1986.
Patent Abstracts of Japan, vol. 9, No. 110 (E-314) (1833), May 15, 1985.

*Primary Examiner*—Frank E. Werner
*Assistant Examiner*—Scott L. Lowe
*Attorney, Agent, or Firm*—James A. Drobile; Robert E. Rosenthal

[57] ABSTRACT

A deceleration zone in a linear motor in-track transit system is provided. The transit system includes a guideway and at least one vehicle carrying a linear motor secondary moveable along the guideway between a freight loading station and a freight unloading station. Linear induction motor (LIM) primaries are disposed along the guideway at spaced intervals to provide thrust to the vehicles. Deceleration zones are designated at certain segments of the guideway wherein reduced speed of the vehicles is required. The deceleration zones include a plurality of spaced permanent magnet decelerators located along the guideway adjacent the vehicle entrance end of the deceleration zone. The decelerators cause eddy currents to flow in the linear motor secondaries carried by vehicles passing thereover due to the magnetic interaction between the decelerators and the linear motor secondaries. The eddy currents result in a retarding thrust being supplied to the vehicles. A synchronous speed linear motor primary is also located in the deceleration zones adjacent the vehicle exit end thereof and functions to supply thrust of an appropriate magnitude and direction to the vehicles to cause vehicles of different mass to leave the deceleration zone at substantially the same speed.

13 Claims, 6 Drawing Sheets

U.S. PATENT DOCUMENTS

| | | | |
|---|---|---|---|
| 4,665,349 | 5/1987 | Matsuo | 318/135 |
| 4,690,066 | 9/1987 | Morishita et al. | 188/164 X |
| 4,700,119 | 10/1987 | Karita | 318/587 |
| 4,709,639 | 12/1987 | Geais | 104/292 |
| 4,716,346 | 12/1987 | Matsuo | 318/38 |
| 4,718,621 | 1/1988 | Horinouchi et al. | 104/292 X |
| 4,721,045 | 1/1988 | Okawa et al. | 104/290 |
| 4,721,892 | 1/1988 | Nakamura et al. | 318/38 |
| 4,800,818 | 1/1989 | Kawaguchi et al. | 104/292 X |
| 4,819,564 | 4/1989 | Brandis et al. | 104/292 |
| 4,836,344 | 6/1989 | Bolger | 191/10 |
| 4,853,602 | 8/1989 | Hommes et al. | 318/38 |
| 4,931,677 | 6/1990 | Heidelberg et al. | 104/292 X |

DECELERATION ZONE IN A LINEAR MOTOR IN-TRACK TRANSIT SYSTEM

FIELD OF THE INVENTION

The present invention relates to a transit system and in particular to a deceleration zone in a linear motor in-track transit system.

BACKGROUND OF THE INVENTION

Transit systems are well known in the art. Some conventional transit systems implement linear induction motors (LIM's) wherein the LIM primaries are located at spaced intervals between the rails of a track and wherein the LIM secondaries or reaction rails are secured to the chassis of vehicles travelling along the track. These transit systems are conventionally designated as LIM in-track transit systems. In these in-track transit systems and as in all transit systems, when more than one vehicles are travelling along the track, it is important to avoid collisions between vehicles. This of course requires the speed of all vehicles travelling along the track to be accurately controlled to ensure that vehicle spacing is maintained. In many systems, to increase vehicle throughput, the vehicles are propelled at high speeds. However, typically in certain segments of the track such as curves, track switches, etc., high speeds are not permitted due to the possibility of derailment. Accordingly, deceleration zones are provided adjacent these sections of track to slow the vehicles so that they travel through these sections of track at a safe speed.

In conventional systems, closed loop control has been implemented in the deceleration zones using multiple LIM primaries and associated controllers therefor. Although these components provide excellent vehicle control, a problem exists in that if the linear induction motor primaries and/or controllers fail, vehicles are not slowed at all (except due to friction and drag) in the deceleration zone and thus, may enter the following sections of the track at unsafe speeds. Furthermore, another problem exists in that the controllers and LIM primaries are expensive and thus, conventional systems using multiple LIM primaries increase construction and operation costs of the transit system.

A prior art in-track transit system is shown in U.S. Pat. No. 4,716,346 to Matsuo which discloses a conveying apparatus including a track having a curve and a carriage movable along the track. The track is provided with a plurality of LIM stators disposed along the straight portions of the track. A reaction rail is secured to the chassis of the carriage and communicates with the stators. Carriage detection sections are also located on the track and are positioned before and after the curved segment of the track. The carriage detection sections co-operate with the LIM stators and detect the speed and mass of the carriage. When a moving carriage passes over a carriage detection section, the speed of the carriage is calculated. A predetermined reverse thrust is then provided to the carriage via an energizing LIM stator and the speed of the carriage is once again calculated. This allows the mass of the carriage to be determined so that the maximum speed of the carriage over the curved section of track can be determined. Once the maximum speed has been calculated, it is compared with the speed of the carriage so that the necessary thrust can be applied to the carriage to ensure that the vehicle travels at the correct maximum speed over the curved segment of track.

As can be seen, the carriage detection sections in the Matsuo system require two controllers and two LIM stators to permit the mass of the carriage to be calculated so that the second LIM stator is capable of being operated to supply the necessary thrust to the carriage, thereby ensuring the carriage to travel along the curved section of the track at the desired speed. It should be apparent that if the controllers or LIM stators in the Matsuo system fail, the carriage is not slowed prior to entering the curved section of the track. Furthermore, the cost of the multiple controllers and LIM stators makes this type of velocity control zone expensive.

It is therefore an object of the present invention to obviate or mitigate the above disadvantages by providing a novel deceleration zone in a linear motor in-track transit system.

SUMMARY OF THE INVENTION

According to the present invention there is provided a deceleration zone in a linear motor in-track transit system, said transit system including a guideway and at least one vehicle movable along said guideway, said vehicle including linear motor secondary means secured thereto, said deceleration zone being located along a section of said guideway and having a vehicle entrance end and a vehicle exit end, said deceleration zone comprising:

magnetic braking means positioned along said guideway adjacent said vehicle entrance end; and linear motor primary means positioned along said guideway adjacent said vehicle exit end wherein said magnetic braking means operates independently of said linear motor primary means and interacts with the linear motor secondary means secured to a vehicle to provide a substantially constant retarding thrust thereto to slow said vehicle and wherein said linear motor primary means interacts with the linear motor secondary means secured to said vehicle and provides thrust thereto, said thrust being of a magnitude and direction so that said vehicle exits said deceleration zone having a velocity substantially equal to a desired velocity.

Preferably, the magnetic braking means includes at least one permanent magnet decelerator (PMD) and the deceleration zone is positioned in the transit system so that vehicles entering the deceleration zone have a speed in the constant force range of the permanent magnet decelerator. It is also preferred that the linear motor primary is in the form of a synchronous linear induction motor. Preferably the permanent magnet decelerators are arranged to slow vehicles of a high mass to a velocity above the synchronous speed of the LIM primary and to slow vehicles of lower mass to a velocity less than the synchronous speed of the linear induction motor primary.

In another aspect of the present invention, there is provided a decelerator for use in an in-track transit system comprising:

magnetic braking means for disposition along a guideway and operable to provide a substantially constant retarding thrust to a vehicle having a reaction element secured thereto and passing thereover; and a synchronous linear motor primary for disposition along said guideway downstream from said magnetic braking means, said synchronous linear motor primary being operable to supply a thrust to said vehicle having a magnitude and direction so that said vehicle assumes a velocity substantially equal to the synchronous speed of said synchronous linear motor primary.

In still yet another aspect of the present invention there is provided a transit system comprising:

a guideway;

at least one vehicle movable along said guideway, said vehicle having a linear motor secondary secured thereto;

a plurality of linear motor primaries disposed along said guideway at spaced intervals, said primaries communicating with a linear motor secondary on a vehicle to supply thrust thereto; and at least one deceleration zone located along a section of said guideway and having a vehicle entrance end and a vehicle exit end, said deceleration zone including magnetic braking means positioned along said guideway adjacent said vehicle entrance end; and a linear motor primary positioned along said guideway adjacent said vehicle exit end wherein said magnetic braking means operates independently of said linear motor primary and interacts with the linear motor secondary secured to a vehicle to provide a substantially constant retarding thrust thereto to slow said vehicle and wherein said linear motor primary interacts with the linear motor secondary secured to said vehicle and provides thrust thereto, said thrust being of a magnitude and direction so that said vehicle exits said deceleration zone having a velocity substantially equal to a desired velocity.

Preferably, the deceleration zones are located in the transit system adjacent and upstream track switches, curves and downgrades to slow vehicles before they enter these sections of the track.

The present invention provides advantages in that the time taken for vehicles having different mass passing through the deceleration zone remains substantially constant thereby maintaining vehicle separation. This allows the throughput of vehicles in the transit system to be increased as compared with conventional systems. Moreover, other advantages exist in that even if the linear motor primary or controller therefor fails, the permanent magnet decelerators provide a retarding thrust to the vehicles ensuring that the vehicles are slowed prior to entering the following section of track. Also, since a synchronous linear motor primary is used, a complex controller for the motor is not required thereby reducing costs.

BRIEF DESCRIPTION OF THE DRAWINGS

An embodiment of the present invention will now be described by way of example only with reference to the accompanying drawings in which.

DETAILED DESCRIPTION OF THE PREFERRED EMBODIMENT

Figure 1:
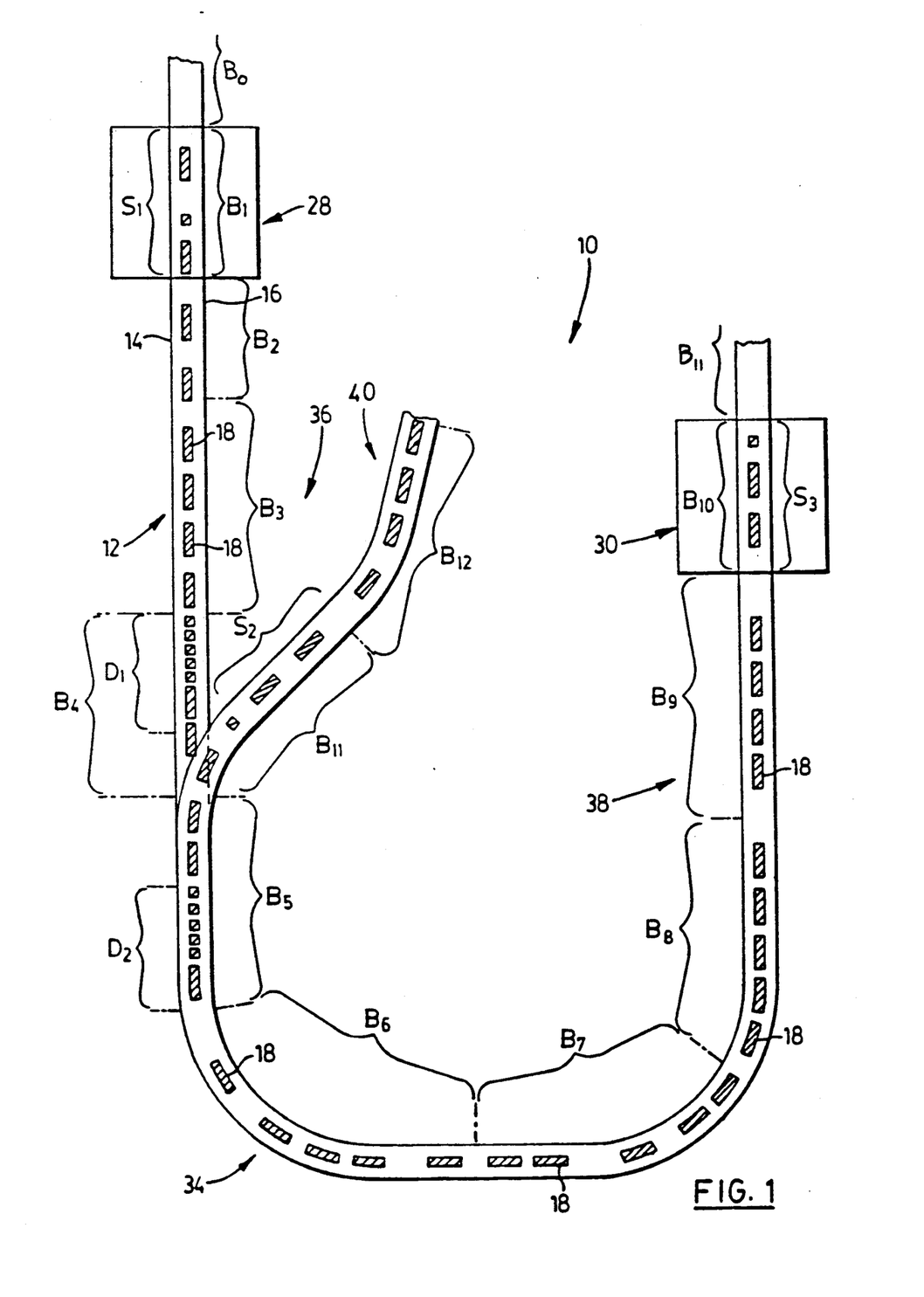
FIG. 1 is a top plan view of a transit system.
Figure 2:
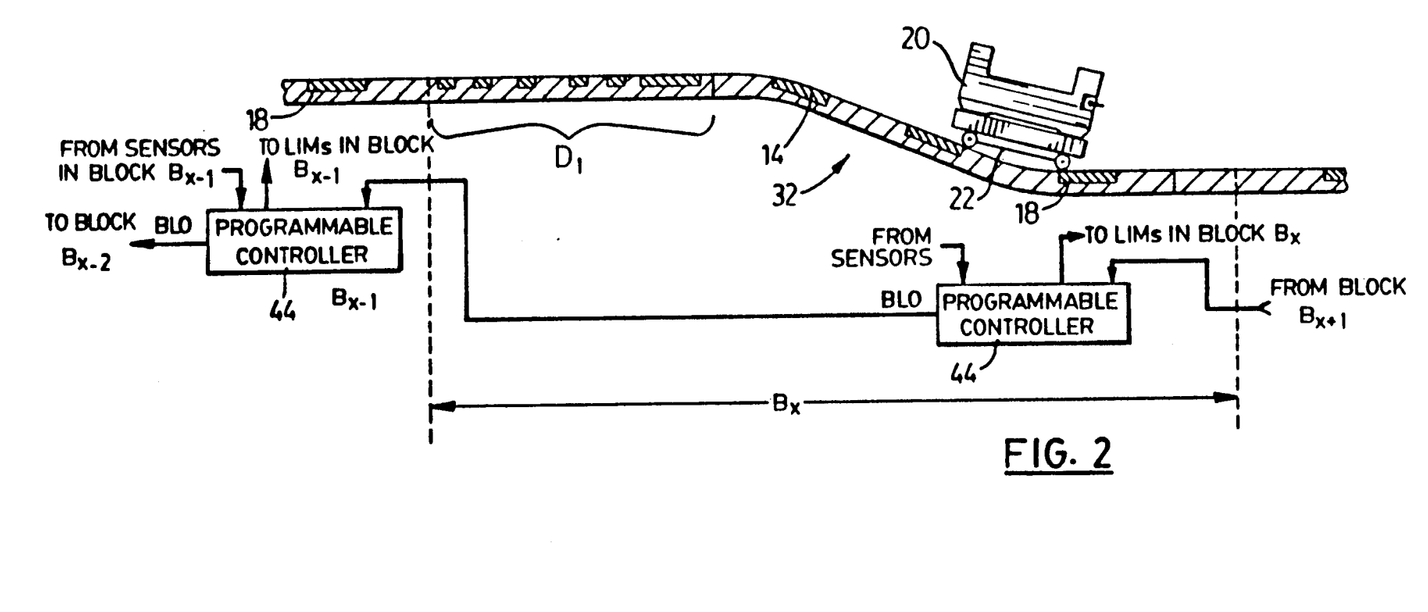
FIG. 2 is a side view of a deceleration zone in the transit system shown in FIG. 1.

Referring now to FIGS. 1 and 2, a transit system is shown and generally indicated by reference numeral 10. The transit system 10 includes a track 12 having a pair of rails 14,16. Linear induction motor (LIM) primaries 18 are located between the rails of the track 12 at spaced intervals. Freight-carrying vehicles 20 are supported by the track 12 and are movable therealong. Each vehicle 20 includes a reaction rail 22 or LIM secondary secured to its chassis which cooperates with the linear induction motor primaries 18 in a known manner to propel the vehicles 20. Since the operation of linear induction motors is well known to those of skill in the art, a detailed description thereof will not be discussed herein.

As can be seen, the track 12 extends between a manual freight loading station 28 and an automatic freight unloading station 30. The majority of the track 12 extending between the two stations 28, 30 is generally horizontal and straight. These sections of the track are designated by reference numerals 36 and 38 and are sections of the track where vehicles are propelled at high speeds to increase vehicle throughput. However, the track also experiences a downgrade 32 (best seen in FIG. 2) and a curve 34 (best seen in FIG. 1) along a portion of its length. Deceleration zones $D_1$ and $D_2$ are also designated along portions of the track 12 adjacent the vehicle entrance end of the downgrade 32 and the vehicle entrance end of the curve 34 respectively. The deceleration zones $D_1$ and $D_2$ are identical and function to slow vehicles 20 travelling along the track between the stations 28,30 to a desired speed before the vehicles leave the deceleration zones and enter the following sections of track as will be described in more detail herein.

A merging section of track 40 intersects the main track 12 at a location adjacent the bottom of the downgrade 32. Similarly, the merging section of track 40 has linear induction motor primaries 18 disposed between the rails thereof at spaced intervals to propel vehicles 20.

Vehicle stopping zones $S_1$ and $S_3$ are designated along the track 12 in the loading and unloading stations 28,30 respectively and function to stop the vehicles 20 at the stations so that freight can be placed on the vehicles and removed therefrom. A stopping zone $S_2$ is also designated along a section of the merge track 40 so that vehicles travelling therealong are automatically stopped before entering the main track 12. The stopping zones $S_1$, $S_2$ and $S_3$ include a primary brake and a secondary brake, each brake of which is operable to stop the vehicle. However, the secondary brake remains in an inoperative condition unless the vehicle 20 has been detected as passing a designated stopping point in the stopping zone due to failure or malfunction of the primary brake.

To increase throughput in the transit system 10, it is desired to move the vehicles 20 along the track 12 between the loading and unloading stations 28,30 respectively as fast as possible with accurate control to avoid high speed collisions. This collision avoidance is achieved by dividing the track into fixed segments or blocks $B_1$ to $B_{12}$. When a vehicle 20 is detected as being present in a block $B_z$ by sensors positioned along the track, a block occupied signal BLO 35 is generated by a controller 44 in the block $B_z$ and is applied to the controller 44 in the previous block $B_{x-1}$. If a vehicle enters the previous block $B_{x-1}$ while the controller 44 therein is receiving the block occupied signal BLO from the adjacent upstream block $B_x$, the LIM primaries 18 in the block $B_{x-1}$ are operated by the controller 44 in a manner to cause the vehicle 20 to be stopped within the block $B_{x-1}$. This prevents two vehicles from being located within the same block and thus, avoids collisions between vehicles and maintains vehicle spacing. This operation is achieved by ensuring that the length of each block $B_x$ is sufficient to stop a vehicle completely or at least to slow a vehicle to a speed such that even if the vehicles collide in the block $B_x$, the impact resulting from the collision can be withstood by the vehicles without any resulting damage.

FIG. 2 better illustrates the deceleration zone $D_1$ positioned upstream from the downgrade 32. Since the deceleration zones $D_1$ and $D_2$ are identical, only the deceleration zone $D_1$ will be described in detail herein. As can be seen, the deceleration zone $D_1$ is located within one of the blocks $B_4$ and is divided into two sections, namely a passive section 50 located adjacent the vehicle entrance end of the deceleration zone $D_1$ and an active section 52 located adjacent the vehicle exit end of the deceleration zone. The passive section 50 includes a plurality of permanent magnets decelerators (PMD's) 54 such as those manufactured by Northern Magnetics Inc. The PMD's 54 are located between the rails 14,16 of the track 12 at spaced intervals. The active section 52 includes a synchronous speed linear induction motor primary 56, such as for example a fixed frequency asynchronous linear induction motor primary. The PMD's 54 in conjunction with the synchronous LIM primary 56 function to reduce the speed of vehicles 20 as they pass through the deceleration zone D while ensuring that vehicles carrying payloads of different mass pass through the deceleration zone in substantially the same amount of time and enter the following section of track 12 at substantially the same speed. The operation of the deceleration zone in this manner, maintains vehicle spacing thereby reducing the probability of vehicular collisions. This, of course, also allows vehicle throughput in the transit system to be maximized. In addition, since the deceleration zone functions to slow vehicles to a predetermined speed, the probability of vehicle derailment in the following sections of track is greatly reduced.

The arrangement of the PMD's 54 within the deceleration zone D and the selection of the synchronous speed linear motor primary 56 can be made to optimize the deceleration zones in terms of the maximum allowable exit speed and minimum speed of a vehicle in the zone as well as travel time differentials between vehicles of different mass passing through the deceleration zone. Although optimization is often desired, in actual practice, the synchronous speed linear motor primary is typically selected based on devices available and used in other segments of the transit system which although do not result in an optimized deceleration zone, will provide an acceptable level of performance.

Figure 3:
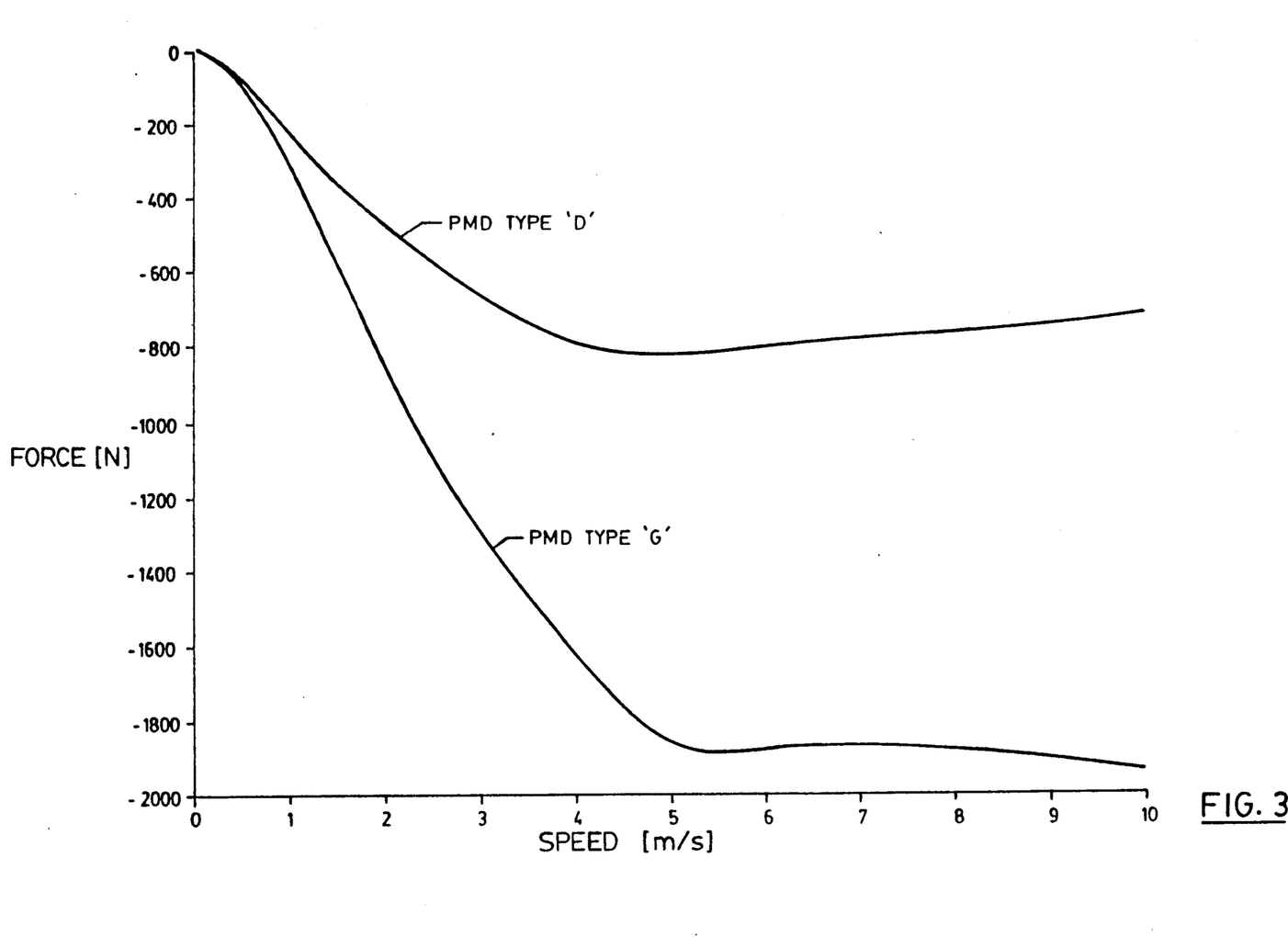
FIG. 3 shows graphs illustrating characteristics of permanent magnet decelerators used in the deceleration zone shown in FIG. 2.

Referring now to FIG. 3, the thrust vs speed characteristics of two types of PMD's 54 are shown, namely "D" type and "G" type permanent magnet decelerators. As can be seen, both "D" or "G" type decelerators provide a somewhat constant braking force to vehicles 20 travelling thereover in the speed range of 4 m/s to 10 m/s although the magnitudes of the braking forces are different. The constant braking force applied to the vehicles in this speed range results in the deceleration of the vehicles becoming primarily a function of their mass and to a far lesser extent drag. Thus, vehicles of different mass passing over these decelerators will be decelerated differently.

Figure 4:
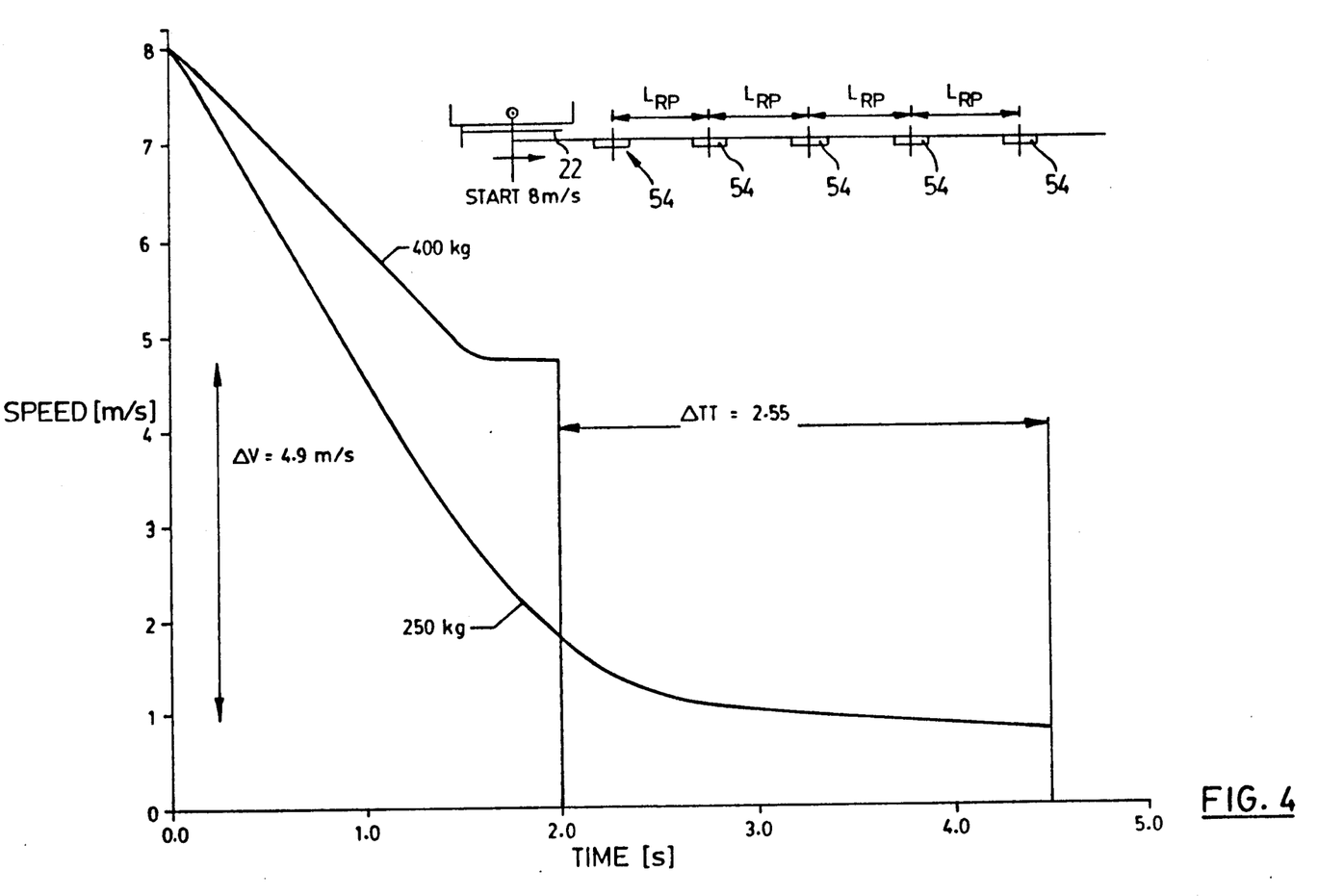
FIG. 4 shows a graph illustrating the response of vehicles passing over the permanent magnet decelerators shown in FIG. 2.

This condition is illustrated in FIG. 4 which shows response curves 60,62 for a 250 kg and a 400 kg vehicle respectively travelling along the track 12 and passing over the passive section 50 of the deceleration zone $D_1$. As can be seen, the passive section 50 includes five "D" type PMD's 54 spaced along the track. The spacing between consecutive PMD's is chosen so that the center to center spacing of consecutive PMD's is equal to the length $L_{RP}$, of the reaction rail 22 secured to the vehicles 20.

In this instance, both vehicles entered the passive section 50 of the deceleration zone $D_1$ having a velocity of 8 m/s. The 400 kg vehicle took approximately two (2) seconds to pass over the passive section 50 and was slowed to an exit velocity of approximately 5 m/s. In contrast, the 250 kg vehicle took approximately four-and-one-half (4.5) seconds to pass over the passive section 50 and was slowed to an exit velocity of approximately 1 m/s. In transit systems where high vehicle throughput is required, the above difference in time taken for vehicles of different mass to travel thereover is unsatisfactory. This is due to the fact that the time difference delta T must be compensated for by increasing vehicle spacing to avoid collisions which of course decreases vehicle throughput. Thus, these types of decelerators are unacceptable when used on their own.

Figure 5:
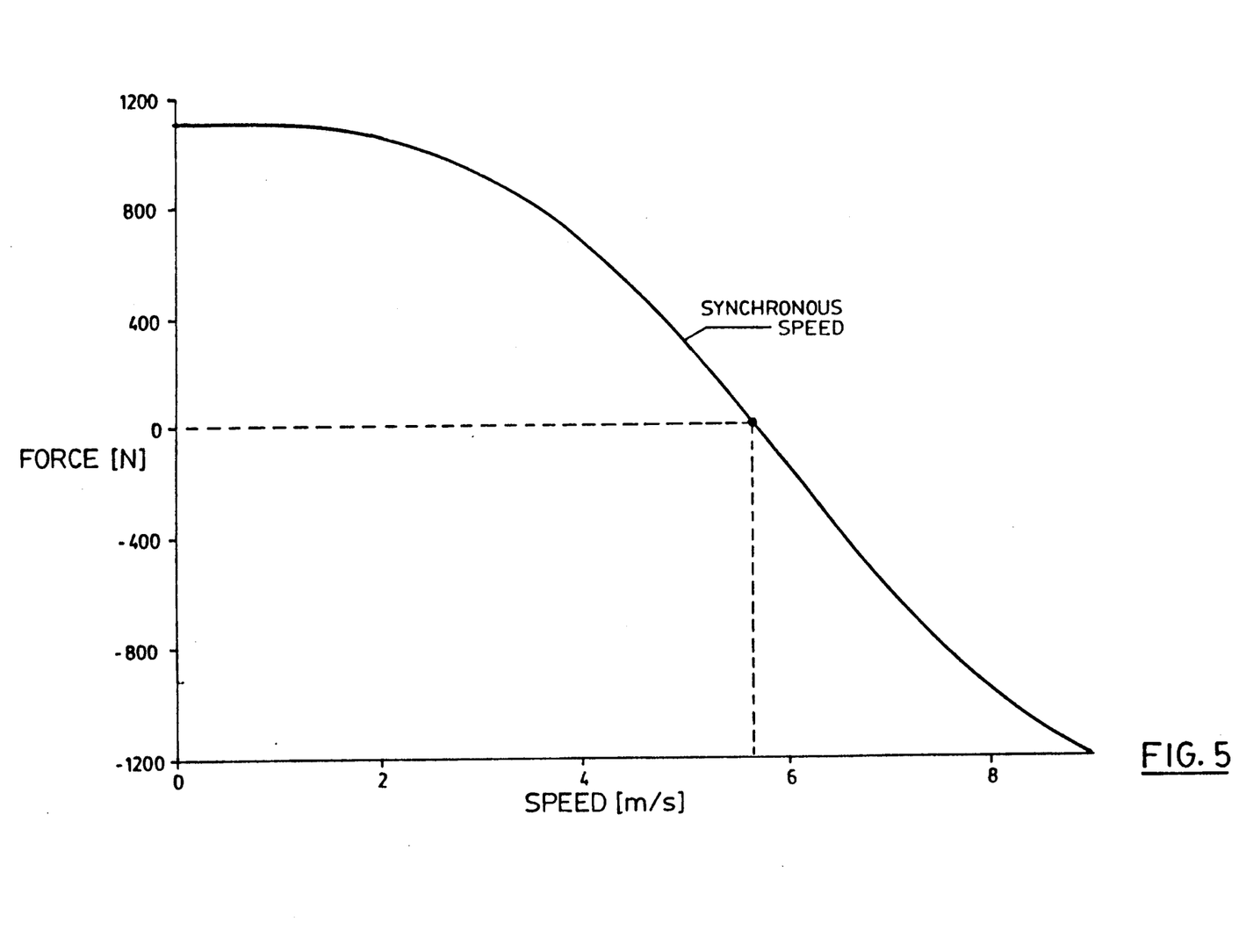
FIG. 5 shows a response curve of a synchronous linear induction motor used in the deceleration zone shown in FIG. 2.

To compensate for the operational nature of the PMD's 54, the synchronous speed linear induction motor (LIM) primary 56 is also provided in the deceleration zone D. As is well known to those of skill in the art, the synchronous speed LIM primary 56 operates to supply thrust having a polarity and direction to a vehicle so that the vehicle leaves the control zone of the synchronous speed LIM primary at substantially the synchronous speed of the LIM primary. FIG. 5 illustrates the characteristics of a synchronous speed LIM primary having a synchronous speed of approximately 5.7 m/s. As can be seen, the synchronous speed LIM primary 56 applies a retarding thrust to vehicles 20 travelling above the synchronous speed and a propulsive thrust to vehicles travelling below the synchronous speed. In the present system, the synchronous speed LIM primary 56 is chosen to have a synchronous speed close to that of the desired exit speed of the vehicles from the deceleration zone D and to have a peak thrust approximately equal to the retarding thrust of the PMD's 54.

Although in the present system 10, the synchronous speed linear motor primary was chosen to have a peak thrust substantially equal to the thrust of the PMD's 54, it should be apparent that synchronous speed linear motors having different thrust characteristics may be employed In general given a specific arrangement of PMD's 54, a synchronous speed linear motor having a greater peak thrust than the PMD's will result in improved performance, namely, decreasing speed and lower time differentials between vehicles of different mass passing through the deceleration zones.

The operation of the transit system 10 and, in particular, the deceleration zones will be now be described. After a vehicle 20 has been loaded at the loading station 28, the LIM primaries in each of the blocks $B_x$ are energized in succession by their controllers so that the vehicle 20 travels towards the unloading station 30 at the desired speed. When the vehicle 20 enters block $B_3$ upstream from the deceleration zone $D_1$, the vehicle 20 is propelled by the LIM primaries 18 therein so that the vehicle enters the deceleration zone $D_1$ having a speed in the constant force range of the PMD's 54 and at a speed so that the reverse thrust applied to the vehicle 20 by the PMD's 54 is insufficient to stop the vehicle 20. When the vehicle enters the deceleration zone $D_1$, the magnetic interaction between the PMD's 54 and the reaction rail 22 secured to the vehicle 20 causes eddy currents to flow in the reaction rail 22. This results in a reverse thrust being applied to the vehicle 20 thereby slowing the vehicle before the vehicle enters the active section 52 of the deceleration zone $D_1$.

To reduce the difference in the time taken for vehicles of different mass to pass through the deceleration zone $D_1$, the number and type of PMD devices 54 used in the passive section 50 are chosen so that a vehicle of average mass in the transit system 10 will leave the passive section 50 having a speed substantially equal to the synchronous speed of the LIM primary 56. Vehicles of lower mass than the average will leave the passive section 50 at a speed less than the synchronous speed while vehicles of greater mass than the average will leave the passive section 50 at a speed greater than the synchronous speed.

When the vehicles enter the active section 52, the synchronous speed LIM primary 56 functions to accelerate the vehicles of lower mass and decelerate the vehicles of higher mass while allowing the averaged mass vehicles travelling at the synchronous speed to pass so that each of the three types of vehicles leaves the deceleration zone $D_1$ at substantially the same speed, this speed being substantially equal to the synchronous speed of the LIM primary 56. In addition, since the synchronous speed LIM primary 56 decelerates heavier vehicles and accelerates lighter vehicles, heavier vehicles take longer to pass over the active section 52 than do lighter vehicles. This difference in time taken for the heavier vehicles to pass over the active section 52 somewhat offsets the difference in time taken for the different massed vehicles to pass over passive section 50, thereby reducing the overall difference in the time taken for vehicles of different mass to pass through the deceleration zone $D_1$.

Figure 6:
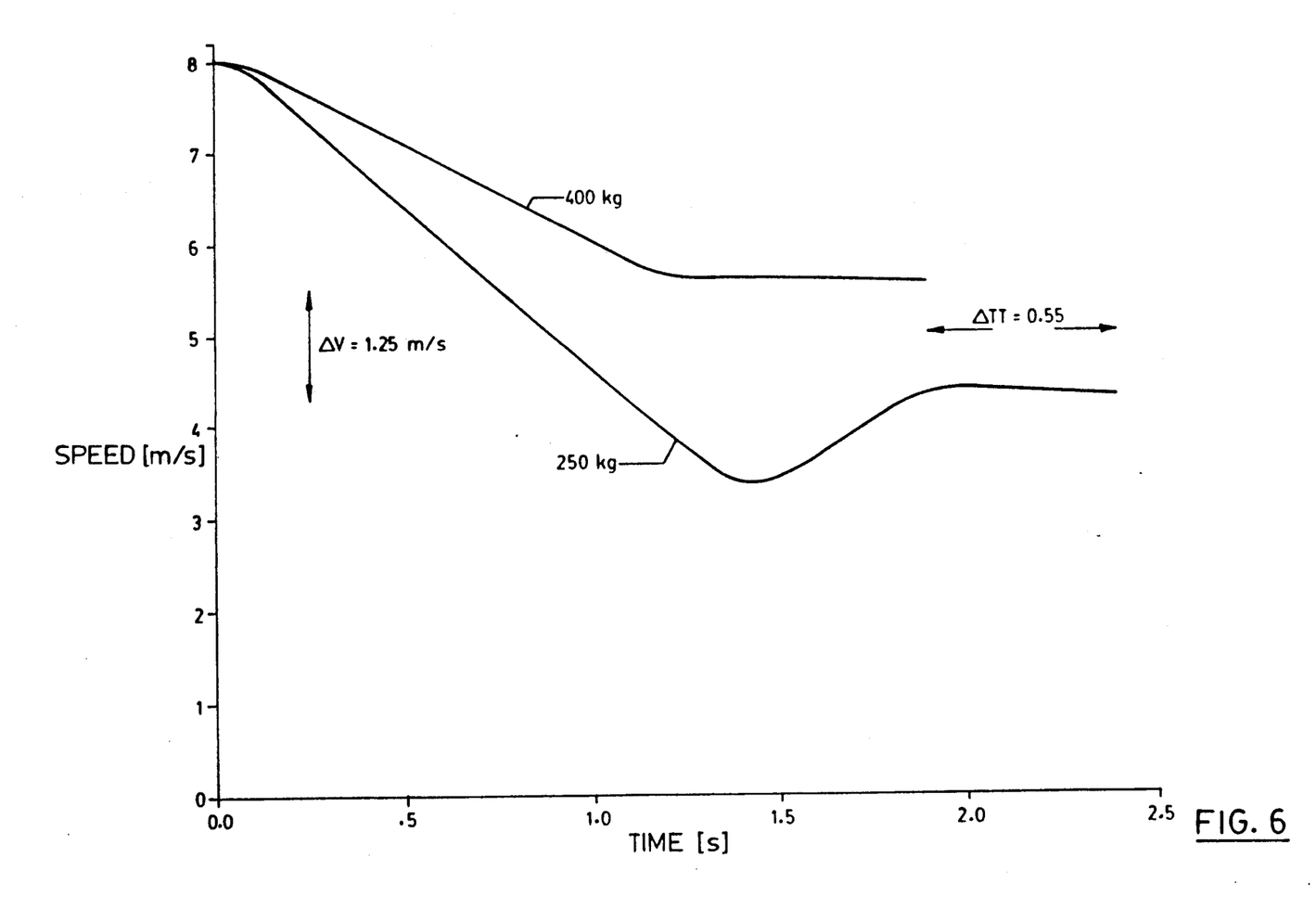
FIG. 6 shows response curves of vehicles passing through the deceleration zone shown in FIG. 2.

This operation is illustrated in FIG. 6 which shows response curves for a 400 kg vehicle and a 250 kg vehicle passing through the present deceleration zone $D_1$. As can be seen, both vehicles entered the deceleration zone $D_1$ having a velocity of 8 m/s. The 400 kg vehicle took two (2) seconds to pass through the deceleration zone $D_1$ and had an exit velocity of approximately 5.7 m/s. The 250 kg vehicle took two-and-a-half (2.5) seconds to pass through the deceleration zone $D_1$ and had an exit velocity of approximately 4.5 m/s. Accordingly, the difference in time taken for the two substantially different mass vehicles to pass through the deceleration zone was only 0.5 seconds. The difference in the exit velocity between the two vehicles was approximately 1.25 m/s.

In comparing the above-described vehicular travel through the deceleration zone D with vehicular travel over only PMD's 54 as shown in FIG. 4, it can be seen that the difference in exit velocity of the two different mass vehicles was reduced from 4.9 m/s to 1.25 m/s. Furthermore, the travel time for the vehicles to pass over these zones was reduced from 2.5 seconds to 0.5 seconds. If a synchronous linear motor primary having a higher peak thrust is chosen for use in the deceleration zone, the time and speed differentials can be further reduced.

Thus, as a vehicle enters the deceleration zone $D_1$, it is slowed to a desired speed before travelling along the downgrade 32. Once the vehicle leaves the downgrade, it is propelled by the LIM primaries 18 towards the curve 34. The deceleration zone $D_2$ which is positioned just upstream from the curve 34, functions in the same manner described above to slow the vehicle before it enters the curve. After the vehicle 20 has been slowed in the deceleration zone $D_2$ and navigates the curve, it is propelled to the unloading station 30 and stopped so that the freight carried by the vehicle 20 can be removed.

The present deceleration zone provides advantages in that the use of the PMD devices in conjunction with the synchronous speed LIM primary provides an inexpensive decelerator which permits vehicles of different mass to be slowed in the deceleration zone to substantially the same exit speed and to travel through the deceleration zone in substantially the same amount of time. Moreover, the use of the PMD devices to provide the initial retarding thrust ensures that all vehicles are slowed even if the synchronous speed LIM primary fails or in the event of a general power failure.

Although, the present device shows the use of permanent magnet devices to slow the vehicle in the passive section, it should be realized that electromagnet devices can also be used, with the electromagnets being supplied by a power supply independent of the synchronous speed LIM primary.

It should be apparent to one of skill in the art that the various modifications and variations can be made to the present invention without departing from the scope thereof as defined by the appended claims.

I claim:

1. A deceleration zone in a linear motor in-track transit system, said transit system including a guideway and at least one vehicle movable along said guideway, said vehicle including linear motor secondary means secured thereto, said deceleration zone being located along a section of said guideway and having a vehicle entrance end and a vehicle exit end, said deceleration zone comprising:

magnetic breaking means in the form of at least one permanent magnet decelerator positioned along said guideway adjacent said vehicle entrance end; and linear motor primary means positioned along said guideway adjacent said vehicle exit end wherein said magnetic braking means operates independently of said linear motor primary means and interacts with the linear motor secondary means secured to a vehicle to provide a substantially constant retarding thrust thereto to slow said vehicle and wherein said linear motor primary means interacts with the linear motor secondary means secured to said vehicle and provides thrust thereto, said thrust being of a magnitude and direction so that said vehicle exits said deceleration zone having a velocity substantially equal to a desired velocity.

2. A deceleration zone as defined in claim 1 wherein said magnetic braking means includes a plurality of spaced permanent magnet decelerators.

3. A deceleration zone as defined in claim 2 wherein said permanent magnet decelerators are located at spaced intervals along said guideway with consecutive decelerators being spaced so that the center to center spacing therebetween is equal to the length of a linear motor secondary means secured to a vehicle.

4. A deceleration zone as defined in claim 3 wherein said linear motor primary means is in the form of a synchronous speed linear motor primary.

5. A deceleration zone as defined in claim 4 wherein said synchronous speed linear motor primary is chosen to have a peak thrust equal to or greater than said constant retarding thrust developed by said magnetic braking means.

6. A deceleration zone as defined in claim 5 wherein said permanent magnet decelerators are arranged to decelerate vehicles having a mass less than a predetermined mass to a speed less than the synchronous speed of said linear motor primary and to decelerate vehicles having a mass greater than said predetermined mass to a speed greater than said synchronous speed, said synchronous speed linear motor primary accelerating said vehicles travelling below said synchronous speed and decelerating said vehicles travelling above said synchronous speed so that said vehicles leave said deceleration zone at substantially said synchronous speed.

7. A deceleration zone as defined in claim 6 wherein said predetermined mass is equal to the mass of an average vehicle carrying an average payload in said transit system.

8. A decelerator for use in an in-track transit system comprising:

magnetic braking means including a plurality of permanent magnet decelerators for disposition along a guideway at spaced intervals such that the center to center spacing therebetween is equal to the length of a reaction element secured to a vehicle in said transit system, said magnetic braking means being operable to provide a substantially constant retarding thrust to a vehicle passed thereover; and a synchronous speed linear motor primary for disposition along said guideway downstream from said magnetic braking means, said synchronous speed linear motor primary being operable to supply a thrust to said vehicle having a magnitude and direction so that said vehicle assumes a velocity substantially equal to the synchronous speed of said synchronous speed linear motor primary.

9. A transit system comprising:

a guideway;

at least one vehicle movable along said guideway, said vehicle having a linear motor secondary secured thereto;

a plurality of linear motor primaries disposed along said guideway at spaced intervals, said primaries communicating with a linear motor secondary on a vehicle to supply thrust thereto;

at least one deceleration zone defined by a section of said guideway and having a vehicle entrance end and a vehicle exit end, said deceleration zone including magnetic braking means in the form of at least one permanent magnet decelerator positioned along said guideway adjacent said vehicle entrance end; and a linear motor primary positioned along said guideway adjacent said vehicle exit end wherein said magnetic braking means operates independently of said linear motor primary and interacts with the linear motor secondary means secured to a vehicle to provide a substantially constant retarding thrust thereto to slow said vehicle and wherein said linear motor primary interacts with the linear motor secondary secured to said vehicle and provides thrust thereto, said thrust being of a magnitude and direction so that said vehicle exists and deceleration zone having a velocity substantially equal to a desired velocity.

10. A transit system as defined in claim 9 wherein said magnetic braking means includes a plurality of spaced permanent magnet decelerators.

11. A transit system as defined in claim 10 wherein said permanent magnet decelerators are located at spaced intervals along said guideway with consecutive decelerators being spaced so that the center to center spacing therebetween is equal to the length of a linear motor secondary means secured to a vehicle.

12. A transit system as defined in claim 11 wherein said linear motor primary means is in the form of a synchronous speed linear motor primary.

13. A transit system as defined in claim 12 wherein deceleration zones are positioned along said guideway adjacent vehicle entrance ends of curved segments of said guideway, track switches and downgrades in said guideway.

* * * * *